US008994882B2

(12) United States Patent
Seshadrinathan et al.

(10) Patent No.: US 8,994,882 B2
(45) Date of Patent: Mar. 31, 2015

(54) CONTROL OF VIDEO PROCESSING ALGORITHMS BASED ON MEASURED PERCEPTUAL QUALITY CHARACTERISTICS

(75) Inventors: Kalpana Seshadrinathan, San Jose, CA (US); Jorge E. Caviedes, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,040

(22) PCT Filed: Dec. 9, 2011

(86) PCT No.: PCT/US2011/064157
§ 371 (c)(1),
(2), (4) Date: Sep. 18, 2013

(87) PCT Pub. No.: WO2013/085538
PCT Pub. Date: Jun. 13, 2013

(65) Prior Publication Data
US 2014/0002745 A1    Jan. 2, 2014

(51) Int. Cl.
*H04N 5/21*    (2006.01)
*H04N 5/911*    (2006.01)
(Continued)

(52) U.S. Cl.
CPC ............... *H04N 5/911* (2013.01); *H04N 5/00* (2013.01); *H04N 19/172* (2014.11); *H04N 19/117* (2014.11); *H04N 19/14* (2014.11); *H04N 19/154* (2014.11); *H04N 19/85* (2014.11)
USPC ........... 348/606; 348/607; 348/625; 348/252; 348/627; 348/180; 382/274; 358/3.27

(58) Field of Classification Search
CPC ................................... H04N 5/21; G06T 5/40
USPC ................. 348/606, 607, 625, 252, 180, 627; 382/274; 358/3.26, 3.27, 532; 375/240.29
See application file for complete search history.

(56) References Cited

U.S. PATENT DOCUMENTS

| 5,214,507 A | 5/1993 | Aravind et al. |
| 6,359,658 B1 | 3/2002 | He et al. |

(Continued)

FOREIGN PATENT DOCUMENTS

| WO | 2013/085538 A1 | 6/2013 |
| WO | 2013/085538 A9 | 7/2014 |

OTHER PUBLICATIONS

International Search Report and Written Opinion received for PCT Application No. PCT/US2011/064157, mailed on Sep. 14, 2012, 10 pages.

(Continued)

*Primary Examiner* — Jefferey Harold
*Assistant Examiner* — Jean W Desir
(74) *Attorney, Agent, or Firm* — Jordan IP Law, LLC (57) ABSTRACT

Systems and methods may provide for conducting a real-time perceptual quality analysis of a video, wherein the perceptual quality analysis includes at least one of a noise measurement, a contrast measurement and a sharpness measurement. One or more strength parameters of one or more post-processing modules in a video processing pipe may be set based on the perceptual quality analysis resulting in overall video processing that adapts to the changing perceptual quality of the input. In one example, the strength parameters include at least one of a contrast parameter and a de-noising parameter. The invention results in visually enhanced video at the output of the post-processing module.

24 Claims, 5 Drawing Sheets

(51) Int. Cl.
*H04N 5/00* (2011.01)
*H04N 19/172* (2014.01)
*H04N 19/117* (2014.01)
*H04N 19/14* (2014.01)
*H04N 19/154* (2014.01)
*H04N 19/85* (2014.01)

(56) References Cited

U.S. PATENT DOCUMENTS

| | | | |
|---|---|---|---|
| 8,730,329 B2 * | 5/2014 | Jiang et al. | 348/187 |
| 2004/0136565 A1 * | 7/2004 | Hannigan et al. | 382/100 |
| 2004/0190633 A1 | 9/2004 | Ali et al. | |
| 2008/0205785 A1 | 8/2008 | Geiger et al. | |

OTHER PUBLICATIONS

Caviedes, "Intelligent Sharpness Enhancement for Video Post-Processing", 14th European Signal Processing Conference (EUSIPCO 2006), Florence, Italy, Sep. 4-8, 2006, 5 pages.

Stark, "Adaptive Image Contrast Enhancement Using Generalizations of Histogram Equalization", IEEE Transactions on Image Processing, vol. 9, No. 5, May 2000, pp. 889-896.

Zhang, et al., "Adaptive Denoising Based on Sure Risk", Signal Processing Letters, IEEE, vol. 5, No. 10, Oct. 1998, pp. 1-8.

International Preliminary Report on Patentability and Written Opinion received for PCT Patent Application No. PCT/US2011/064157, mailed on Jun. 19, 2014, 7 pages.

* cited by examiner

CONTROL OF VIDEO PROCESSING ALGORITHMS BASED ON MEASURED PERCEPTUAL QUALITY CHARACTERISTICS

BACKGROUND

Consumer electronics platforms such as smart televisions (TVs), set-top boxes, blu-ray players, laptops, tablet, cell phones, etc., may display video content from a variety of sources such as professional content, online streaming video content, Internet based content, and home content shot on multiple devices, wherein the perceptual quality of the video content can vary over a broad range. While video-enabled platforms may contain one or more video post-processing components such as de-noising and contrast enhancement components, these components can have fixed operating points that might not account for the significant variability in perceptual video quality of the input source.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include an apparatus having logic to conduct a perceptual quality analysis of a video and set one or more parameters of a post-processing module that control the strength of various post-processing elements based on the perceptual quality analysis. The logic can also apply the video to the post-processing module. The term "perceptual quality" may refer to the quality of the video as visible to an average human observer.

Embodiments may also include a system having an image capture module to generate a video, a post-processing module and logic to conduct a perceptual quality analysis of the video. The logic can also set one or more strength parameters of the post-processing module based on the perceptual quality analysis, and apply the video to the post-processing module. The perceptual quality analysis module may incorporate a model of human visual processing to predict perceptual quality of the video.

Additionally, embodiments may include a computer readable storage medium having a set of instructions, which, if executed by a processor, cause a computer to conduct a perceptual quality analysis of a video. The instructions, if executed, can also cause a computer to set one or more strength parameters of a post-processing module based on the perceptual quality analysis, and apply the video to the post-processing module.

Other embodiments may involve a computer implemented method in which a real-time perceptual quality analysis of a video is conducted, wherein the real-time perceptual quality analysis may include one or more of a perceptual noise measurement, a perceptual contrast measurement and a perceptual sharpness measurement. Perceptual measurements of noise, contrast, sharpness, etc., can measure the perceived amount of noise, contrast or sharpness by an average human observer. They do not simply measure the amount of noise, contrast or sharpness in the image signal. One or more strength parameters of a post-processing module can be set based on the real-time perceptual quality analysis, wherein one or more parameters may include one or more of a contrast parameter and a de-noising parameter. In addition, the video may be applied to the post-processing module.

Figure 1:
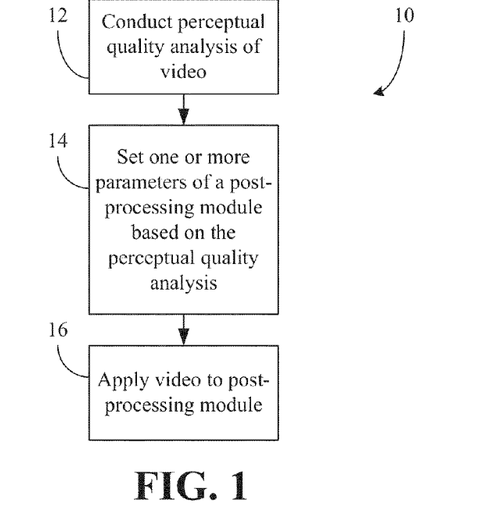
FIG. 1 is a flowchart of an example of a method of enhancing video perceptual quality according to an embodiment.

Turning now to FIG. 1, a method 10 of enhancing video perceptual quality is shown. The method 10 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), CMOS or transistor-transistor logic (TTL) technology, or any combination thereof. For example, computer program code to carry out operations shown in the method 10 may be written in any combination of one or more programming languages, including an object oriented programming language such as C++ or the like and conventional procedural programming languages, such as the "C" programming language or similar programming languages. Moreover, the method 10 could be implemented using any of the aforementioned circuit technologies.

Illustrated processing block 12 provides for conducting a perceptual quality analysis of a video. In particular, the perceptual quality analysis may be conducted in real-time so that the video may be enhanced while it is being output to a display of a platform such as a laptop, personal digital assistant (PDA), wireless smart phone, media player, imaging device, mobile Internet device (MID), any smart device such as a smart phone, smart tablet, smart TV and so forth, or any combination thereof. As will be discussed in greater detail, the real-time perceptual quality analysis can include perceptual noise measurements, perceptual contrast measurements, perceptual sharpness measurements, and so forth. Moreover, these measurements may be conducted in parallel, in series, or a combination thereof, depending upon the circumstances. One or more parameters (e.g., coefficients, gains, settings) that control the strength of a post-processing module may be set at block 14 based on the perceptual quality analysis, wherein the parameters can include, but are not limited to, contrast parameters and de-noising parameters. Block 16 may provide for applying the video to the post-processing module so that the video will be enhanced according to the parameters set in block 14.

Figure 2:
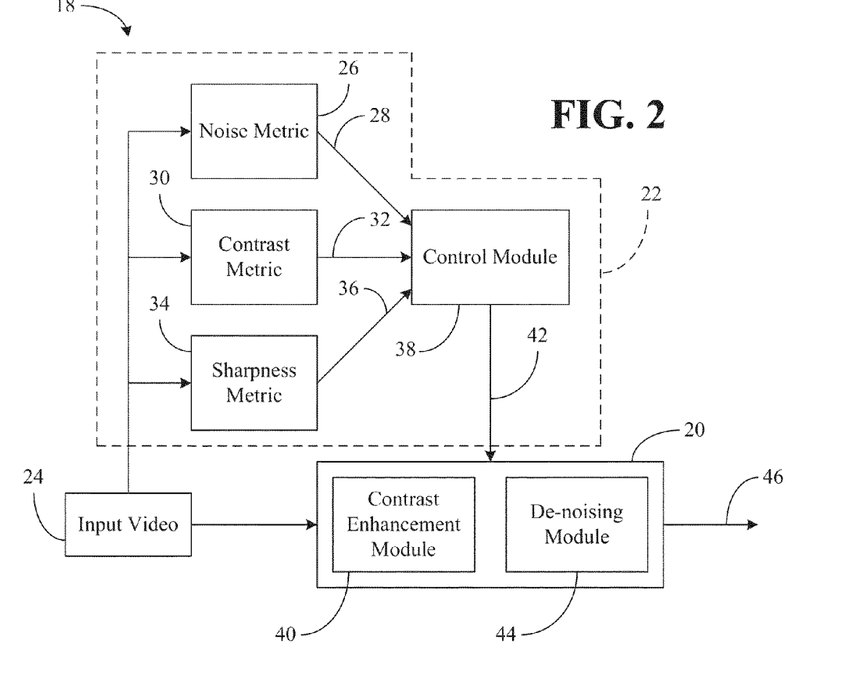
FIG. 2 is a block diagram of an example of a video enhancement apparatus according to an embodiment.

FIG. 2 shows an apparatus 18 having a post-processing module 20 and perceptual quality analysis logic 22, wherein the perceptual quality analysis logic 22 may be used to improve the perceptual quality of an input video 24 in real-time. The input video 24 might be received from, for example, a YouTube web server, video editing software, a camera phone and/or other image capture device. In one example, the post-processing module 20 is near the end of a video pipeline. The illustrated perceptual quality analysis logic 22 includes a perceptual noise metric component 26 to make one or more noise measurements and generate a local noise map 28 based on the noise measurements. The local noise map 28 may therefore contain perceptual noise data on a pixel-by-pixel basis, frame-by-frame-basis, and so forth. Similarly, a contrast metric component 30 can make one or more perceptual contrast measurements and generate a local contrast map 32 based on the contrast measurements, wherein the local contrast map 32 may contain perceptual contrast data. The illustrated perceptual quality analysis logic 22 also includes a perceptual sharpness metric component 34 that conducts one or more sharpness measurements and generates a local sharpness map 36. Other considerations such as color vibrance, blocking, ghosting, judder, motion compensation mismatches, etc., may also be used to evaluate perceptual video quality.

In one embodiment, the noise metric logic may include the following computation. A square window of size M×M×T is considered at each pixel location in the input video. An estimate of the mean (µ) and the standard deviation (σ) of the pixels within the window is computed at this location. An estimate of the perceptual noise (N) is then derived using:

$$N = \frac{\mu}{\sigma + \kappa}$$

where κ is a small constant added to stabilize N. This definition of noise is consistent with the Weber-Fechner law for human vision. The Weber-Fechner law states that the ratio of discriminable difference in intensity (ΔI) to the intensity level (I) that the human observer is adapted to is a constant over a wide intensity range. The computation specified above may also be performed in other domains than the pixel domain such as on wavelet coefficient sub-bands, DCT domain, etc. Further, the size of the window over which the noise estimation is performed may be adapted based on the resolution of the input video, size of the screen and typical viewing distances of observers. Finally, this estimation may be extended to video by considering spatio-temporal windows that may be obtained via motion compensated processing.

In the pixel domain, small values of N are indicative of noise in the input video, while larger values may be the result of strong edges or textures present in the input video. A threshold may hence be applied to pixel-level noise values to determine perceptual noise. A frame-level perceptual noise indicator may be derived as the average of noise values that are lower than the specified threshold. Other strategies for pooling pixel-level noise values include the coefficient of variation or the difference between the mean and the standard deviation. These would account for perceived degradation in quality due to regions of severe quality degradation in the frame or large variations in perceptual quality within a frame.

In other domains such as the wavelet domain, thresholding may be unnecessary due to the decomposition of both signal and noise into different sub-bands corresponding to different frequencies and/or orientations. An average across different sub-bands or a weighted summation with different weights being assigned to different sub-bands based on human visual sensitivities to those frequencies and orientations may be used to obtain pixel level noise values. These pixel level noise values may be combined to form an estimate of frame level noise as described above.

The illustrated control module 38 optimizes one or more operating points of the post-processing module 20 on-the-fly based on the perceptual quality analysis. The control module 38 implements control policies based on its interpretation of the signals and by taking into account human perception of quality. As an example, the control module 38 may receive the maps 28, 32, 36, and analyze the data contained therein to determine the parameters to be used in the de-noising and contrast enhancement modules that processes the video in 20. As an example, the noise map 28 can be used to determine optimal settings for a de-noising module 44 in the post-processing pipeline. Indeed, this analysis can be performed locally or globally. For instance, increasing de-noising strength typically degrades the sharpness of the video. Since noise is perceptually more visible in smoother regions of the input video that does not contain sharp edges or textures, de-noising can selectively be applied in local regions suffering from large perceptual noise to eliminate noise without degrading edges or textures. The control module 38 may also directly or indirectly handle special conditions such as change of scene (scene change detector can be one of the metrics, or the control module 38 can infer indirectly that there was a change of scene) and reset the parameters to the default before doing the next analysis. Historical data can also be used by the control module 38.

Indeed, the perceptual quality analysis may include a joint analysis of two or more of the perceptual quality metrics in order to determine the best strength parameters due to by exploiting the interaction/relationship between the two or more perceptual quality metrics. For example, many contrast enhancement algorithms enhance noise and introduce ringing artifacts around sharp edges when attempting to increase the contrast in the input video. The control module 38 can perform a joint analysis of the local contrast and local sharpness to selectively enhance contrast by turning it off in noisy or sharp regions of the video. This provides dual benefits of contrast enhancement where it is beneficial and eliminating artifacts due to the enhancement in other regions of the video. Further, this control can be applied on top of any existing configurations present in the video processing pipeline corresponding to different operating modes such as processing noisy video, processing upscaled video, processing high-definition movies, etc. The control module 38 can detect these cases and use these existing configurations as initialization parameters, as well as adapt the control to these existing configurations, to amplify their power when used in conjunction with the control module 38.

In one embodiment, the noise metric may be used to control the strength of de-noising of an input video on a per-frame basis. Per-frame control is easy to implement in real-time systems such as system-on-chip devices. A perceptual noise estimate (Ni) from a field (or frame for progressive videos) i is used to determine the operating point of the de-noising module for field (or frame) i or i+1 of the input video. The noise estimate can vary considerably from frame to frame of an input video for a variety of reasons such as scene change, appearance of text in the video or inaccuracies in the perceptual prediction model etc. Sudden changes in the de-noising strength due to changes in the noise estimate can cause annoying visual artifacts in the video. To avoid this, noise estimates may be smoothed within a temporally moving window before being used for control.

Let $\{N_i, i=1, 2, \ldots T\}$ represent noise estimates from field (or frame) $i=\{1, 2, \ldots T\}$ of the input video. A smoothed noise estimate $S_i$ is then derived for each field by first sorting the noise estimates in an M-point window. M can be determined based on the frame rate of the input video or the desired duration of smoothing. As an example, M can correspond to the number of frames corresponding to 0.2 seconds. The M/2 values that fall in the middle of this sorted array are then averaged using a 5-point Gaussian kernel to obtain $S_i$:

$$T_i = \text{sort}(N_j, j=i-M/2, i-4, \ldots i+4, i+M/2)$$

Here, $T_i$ is an M-point vector that contains the noise estimates from an M-point window surrounding field (or frame) i in sorted order. $T_i(0)$ represents the smallest element in the vector and $T_i(M-1)$ represents the largest element. The elements in this vector are then smoothed using a M/2 point Gaussian kernel w to obtain the smoothed estimate $S_i$:

$$S_i = \Sigma_{j=i-M/4}^{i+M/4} w(j+M/4) T_i(j)$$

$S_i$ is then used to determine the operating point of de-noising. Depending on the specific de-noising algorithm present in the post-processing pipeline, $S_i$ can be used to modify the filtering strength. As a simple example, many de-noising methods use a lowpass or order statistic filter whose standard deviation can be increased to increase the strength of de-noising. With increasing noise levels, kernels of increasing standard deviations can be used to increase the strength of noise filtering. The standard deviation of the kernel can be chosen as:

$$\sigma_i = \kappa(S_i - 100)/100 \text{ if } S_i > N_{max}$$
$$= 0 \text{ otherwise}$$

Here, $\kappa$ controls the sensitivity of control. Increasing $\kappa$ increases the amount of noise filtering performed when the noise estimate changes. By default, $\kappa$ is set to 1, but can be controlled using a configuration control in the Pipeline Controller module. The threshold of $N_{max}$ is chosen to start de-noising to prevent degradation of video quality due to unnecessary de-noising for input signals that have sufficient perceptual quality. A suitable value for $N_{max}$ needs to be determined based on the characteristics of the perceptual noise metric. Due to smoothing of the noise estimates and the fact that the control strategy changes the standard deviation of the Gaussian kernel along a smooth curve, there is less likelihood of introducing any transient or flickering artifacts in the processed video due to adaptive control.

In another embodiment, a control algorithm may utilize the contrast and sharpness measurements at each pixel to determine a suitable contrast enhancement parameter for that pixel.

The control strategy may try to limit enhancement in smooth or smoothly varying textures of the input video, where enhancement of noise is most visible. Limiting enhancement in these regions is desirable since the benefit of local contrast enhancement in these regions is limited. Additionally, the control policy may limit contrast enhancement in smoothly varying textures such as sky or skin regions, since the unnatural appearance that is created by contrast enhancement of such textures results in reduced visual quality. The control algorithm utilizes the contrast measurement to detect smooth or slowly varying textures, since such regions typically have low contrast. The control policy turns off enhancement completely for regions below a certain threshold contrast and slowly ramps up to maximum enhancement as the contrast increases above this threshold.

Second, the control strategy tries to control enhancement along sharp edges to avoid introduction or amplification of ringing artifacts. The control policy uses the sharpness metric to detect local edge regions and ramps down the enhancement as edge strength increases, until the enhancement is turned off completely for very strong edges.

The contrast and sharpness measurements provide pixel-level estimates of the perceived local contrast and local sharpness of the input image. Let $C(x,y)$ denote the local contrast estimated by the contrast measurement at pixel $(x,y)$ of the input image. Let $G(x,y)$ denote the local sharpness estimated by the sharpness metric at each pixel $(x,y)$ of the input image. It is important to ensure that both metrics are synchronized in measuring the contrast and sharpness of the same local neighborhood of a pixel. In the case that this is not true, it is necessary to post-process the one of the estimates.

One embodiment of post-processing may include the following. Assume that the sharpness metric utilizes a M-pixel computation to estimate sharpness. The contrast measurement utilizes an L-pixel window, where L>M without loss of generality.

Consider the local sharpness metric values obtained from the no-reference metrics in a K×K window surrounding each pixel $(x,y)$, where K=L−M. The window consists of: $G(x+i,y-j)$ where $i=\{-(K-1)/2, \ldots, -(K-1)/2\}$, $j=\{-(K-1)/2, \ldots, -(K-1)/2\}$. Let $g=\{g_1, g_2, \ldots, g_T\}$ denote a vector containing these local sharpness metric values, where $T=K^2$. Let $g'=\{g'_{(1)} \leq g'_{(2)}, \ldots, g'_{(T)}\}$ denote a vector containing the elements of g sorted in ascending order. Thus, $g'_{(1)} \leq g'_{(2)} \leq \ldots \leq g'_{(T)}$. The local sharpness metric estimate at $(x,y)$ is computed using:

$$S(x,y) = \frac{1}{K} \sum_{m=0}^{K-1} g'_{(T+m)}$$

Thus, the sharpness value $S(x,y)$ is obtained as the average of the K largest values provided by the sharpness metric in a K×K window surrounding each pixel $(x,y)$.

The post-processing operation is advantageous for at least two reasons. First, since the sharpness metric is computed using an M-pixel window, it exhibits large values at the location of an edge within utmost M pixels of an edge. To avoid or ameliorate ringing around edges, the enhancement needs to be turned off or reduced in a neighborhood surrounding the edge and not just at the edge pixels. This is achieved by the post-processing stage. Second, the size of the post-processing window is chosen such that the contrast and sharpness metrics measure the local signal characteristics in the same neighborhood. Since the contrast metric uses an L×L window and the sharpness metric uses a M-pixel window followed by an (L−M)×(L−M) window for post-processing, contrast and sharpness metrics increase in a synchronized manner when an edge is encountered.

Let $\alpha_1, \alpha_2$ denote constants that govern the control policy along the contrast measurement domain. Similarly, let $\beta_1$ and $\beta_2$ denote constants that govern the control policy along the sharpness measurement domain.

Figure 3:
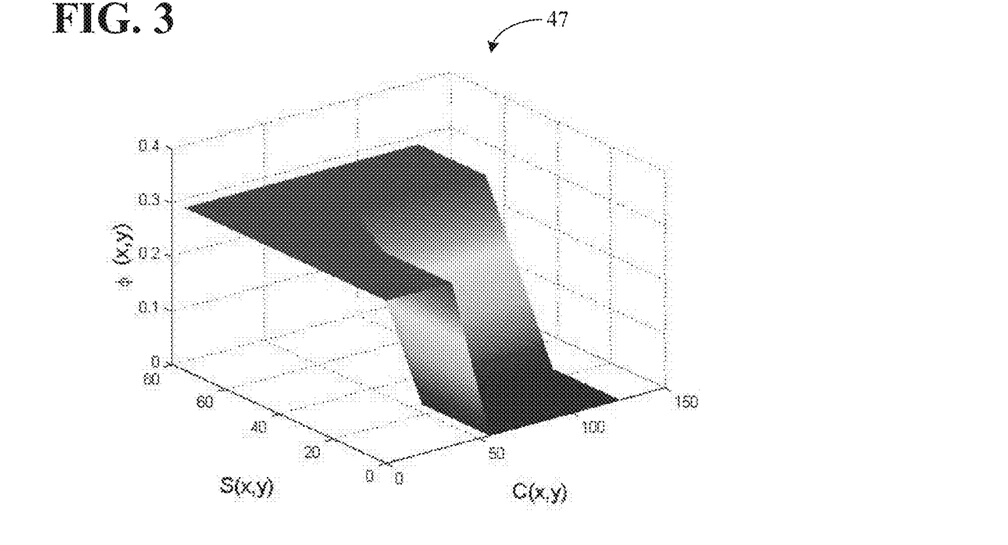
FIG. 3 is a plot of an example of an open loop control surface according to an embodiment.

The control policy uses the contrast and sharpness metrics in conjunction to determine the enhancement parameter for each pixel of the input image. The contrast enhancement parameter $\phi(x,y)$ for each pixel is defined as:

$$\varphi(x, y) = \begin{cases} \infty, & C(x, y) < \alpha_1 \| S(x, y) \geq \beta_2 \\ \varphi_{max} - \frac{(\varphi_{max} - \varphi_{min})}{\alpha_2 - \alpha_1} * [C(x, y) - \alpha_1], & \alpha_1 \leq C(x, y) \leq \alpha_2 \; \&\& \; S(x, y) < \beta_1 \\ \varphi_{max} - \frac{(\varphi_{max} - \varphi_{min})}{\alpha_2 - \alpha_1} * [C(x, y) - \alpha_1] + \\ \quad \frac{(\varphi_{max} - \varphi_{min})}{\beta_2 - \beta_1} * [S(x, y) - \beta_1], & \alpha_1 \leq C(x, y) \leq \alpha_2 \; \&\& \; \beta_1 \leq S(x, y) \leq \beta_2 \\ \varphi_{min}, & C(x, y) > \alpha_2 \; \&\& \; S(x, y) < \beta_1 \\ \varphi_{min} + \frac{(\varphi_{max} - \varphi_{min})}{\beta_2 - \beta_1} * [S(x, y) - \beta_1], & C(x, y) > \alpha_2 \; \&\& \; \beta_1 \leq S(x, y) \leq \beta_2 \end{cases}$$

Note that the contrast enhancement is turned off completely whenever the local contrast is less than $\alpha_1$ or the local sharpness is greater than $\beta_2$. This policy achieves the two desired objectives of eliminating artifacts due to contrast enhancement in smooth/slowly varying textures and strong edges.

As the local contrast increases above $\alpha_1$, the local contrast enhancement slowly ramps up from minimum to maximum amount of enhancement. Note from the equation that $\phi(x,y)=\phi_{max}$ when $C(x,y)=\alpha_1$ and $\phi(x,y)=\phi_{min}$ when $C(x,y)=\alpha_2$, whenever $S(x,y)<\beta_1$. The value of $\phi_{max}$ may be chosen suitably high so that no visual artifacts are created when the local contrast $C(x,y)$ increases from $<\alpha_1$ (corresponding to no enhancement) to $\alpha_1$ (corresponding to minimum enhancement).

The sharpness metric modulates the enhancement term to reduce enhancement in the presence of edges to reduce ringing artifacts. As sharpness increases above $\beta_1$, the amount of enhancement is slowly ramped down from maximum to minimum amount of enhancement. Note from the equation that $\phi(x,y)=\phi_{min}$ when $S(x,y)=\beta_1$ and $\phi(x,y)=\phi_{max}$ when $S(x,y)=\beta_2$, whenever $C(x,y)>\alpha_2$.

FIG. 3 illustrates the resulting control surface in plot 47. For illustration purposes, $\phi(x,y)$ is set to $\phi_{max}$ wherever $\phi(x,y)=\infty$.

This control policy eliminates visual artifacts at smooth regions or edges and improves contrast of the input video, while the smooth control strategy ensures that no flickering artifacts are created by varying strength parameters on a per-frame basis.

The above-described method may be re-used for any other or any number of quality measurements.

The illustrated post-processing module 20 includes a contrast enhancement module 40 that can adjust the contrast of the input video 24 to improve the visual appearance of the input video 24. Similarly, the de-noising module 44 may reduce noise in the input video 24 (e.g., correcting for video compression or other noise sources such as blocking, graininess etc.) to improve the visual appearance of the input video 24 from a noise standpoint. The modules 40, 44 can have respective operating points that are dependent upon one or more parameters that control the strength of processing, wherein the enhancement parameters in the illustrated example are variable in real-time. Thus, a parameter adjustment signal 42 from the control module 38 may set one or more parameters of the post-processing module 20 based on the perceptual quality analysis in order to enhance the perceptual quality of the input video 24. In particular, the parameter adjustment signal 42 might set contrast gain settings and/or other parameters associated with the contrast enhancement module 40, set de-noising gains/settings/parameters associated with the de-noising module 44, and so forth. As a result, an output video 46 may be significantly improved from a visual perspective.

Figure 4:
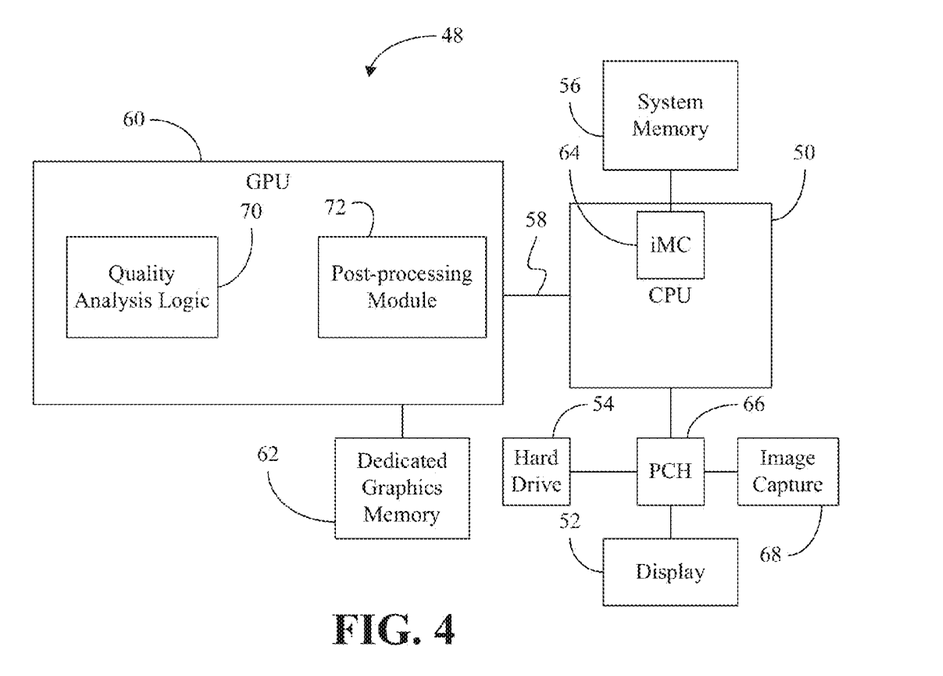
FIG. 4 is a block diagram of an example of a video-enabled computing system according to an embodiment.

Turning now to FIG. 4, a video-enabled computing system 48 is shown in which real-time video perceptual quality analysis is implemented. The computing system 48 may be part of a mobile platform such as a laptop, PDA, wireless smart phone, media player, imaging device, MID, any smart device such as a smart phone, smart tablet and so forth, or any combination thereof. The computing system 46 may also be part of a fixed platform such as a personal computer (PC), smart TV, server, workstation, etc. The illustrated computing system 48 includes one or more CPUs (central processing units) 50, a display device 52, a hard disk drive 54 and system memory 56, which could include, for example, double data rate (DDR) synchronous dynamic random access memory (SDRAM, e.g., DDR3 SDRAM JEDEC Standard JESD79-3C, April 2008) modules. The modules of the system memory 56 may be incorporated into a single inline memory module (SIMM), dual inline memory module (DIMM), small outline DIMM (SODIMM), and so forth.

The computing system 48 may include a graphics bus (e.g., slot) 58, wherein a graphics card (not shown) containing a graphics processing unit (GPU) 60 and dedicated graphics memory 62 could be coupled (e.g., plugged into) the graphics bus 58. For example, the graphics bus 58 could include a PCI Express Graphics (PEG, e.g., Peripheral Components Interconnect/PCI Express x16 Graphics 150W-ATX Specification 1.0, PCI Special Interest Group) bus, an Accelerated Graphics Port (e.g., AGP V3.0 Interface Specification, September 2002) bus, and so forth. The CPUs 50 may have an integrated memory controller (iMC) 64, and one or more processor cores (not shown) to execute one or more drivers associated with a host OS (operating system) and/or application software, wherein each core may be fully functional with instruction fetch units, instruction decoders, level one (L1) cache, execution units, and so forth. The CPUs 50 could alternatively communicate with an off-chip variation of the iMC 64, also known as a Northbridge, via a front side bus. The illustrated CPUs 50 communicate with a platform controller hub (PCH) 66, also known as a Southbridge, via a hub bus. The iMC 64/CPUs 50 and the PCH 66 are sometimes referred to as a chipset.

The illustrated computing system 48 also includes an image capture module 68, which may be used to obtain video content for visual output via the display device 52. The image capture module 68 could include, for example, be a camera, camcorder, etc. The video content may also be obtained from software running on the CPUs 50, or from a off-platform device (e.g., web server, remote image capture device, etc.) via a network controller (not shown). Due to the wide variety of sources for the video content displayed by the computing system 48, the perceptual quality of the content may vary considerably.

Accordingly, the illustrated GPU 60 includes perceptual quality analysis logic 70 that conducts a real-time perceptual quality analysis of the video and sets one or more parameters of a post-processing module 72 based on the real-time perceptual quality analysis. The perceptual quality analysis logic 22 (FIG. 2), already discussed, may be readily substituted for the illustrated perceptual quality analysis logic 70. Thus, the input video may applied to the post-processing module 72 with the adjusted parameters, wherein the resulting output video can have a substantially improved level of perceptual quality.

Figure 5:
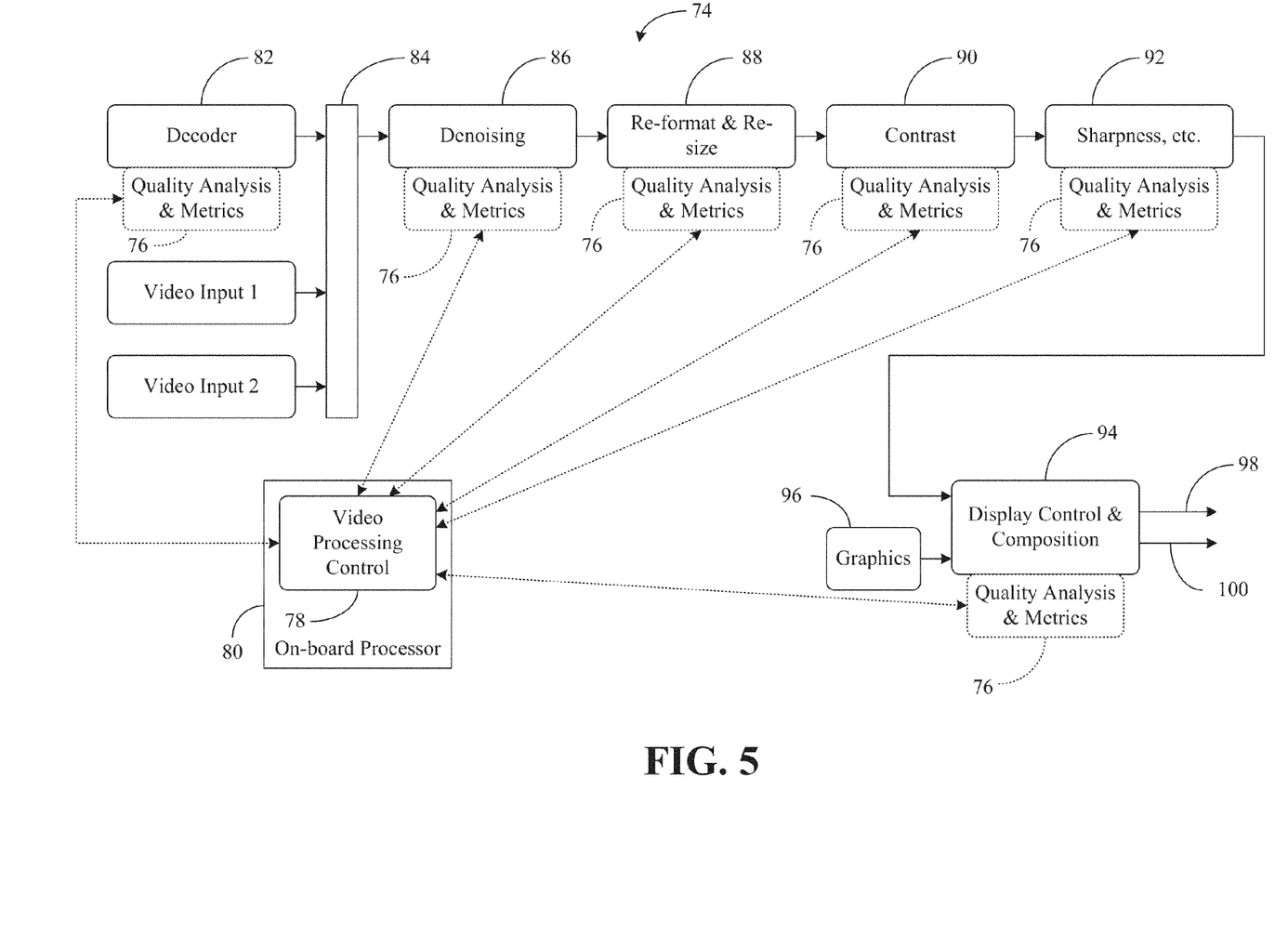
FIG. 5 is a block diagram of an example of a system-on-chip architecture according to an embodiment.

FIG. 5 shows a system-on-chip (SoC) architecture 74 in which quality analysis and metrics 76 may be conducted by video processing control logic 78 of an on-board processor 80 at various stages of a video pipeline. In particular, the illustrated architecture 74 includes a decoder 82 that may decode a video signal, and store the decoded video signal to memory 84 for retrieval by a denoising module 86. The denoising module 86 can provide a noise-corrected video signal to a re-format and re-size module 88, which may in turn provide a re-formatted video signal to a contrast module 90. The contrast module 90 may provides a contrast adjusted video signal to a sharpness module 92 for any sharpness adjustments that may be appropriate. The resulting signal may be provided to a display control and composition module 94. The illustrated display control and composition module uses the signal from the sharpness module 92 and a graphics input 96 to generate a display output 98 (e.g., for viewing) as well as a transcoder output 100 (e.g., for local storage). In the illustrated example, the quality analysis and metrics 76 may be conducted at one or more of the decoder module 82, the denoising module 86, the re-format and re-size module 88, the contrast module 90, the sharpness module 92, and the display control and composition module 94. Further, the order of the denoising module 86, the re-format and re-size module 88, the contrast module 90 and the sharpness module 92 may be interchanged. Additionally, the video post-processing pipeline may include other video processing modules such as frame rate conversion, skin enhancement, etc.

Figure 6:
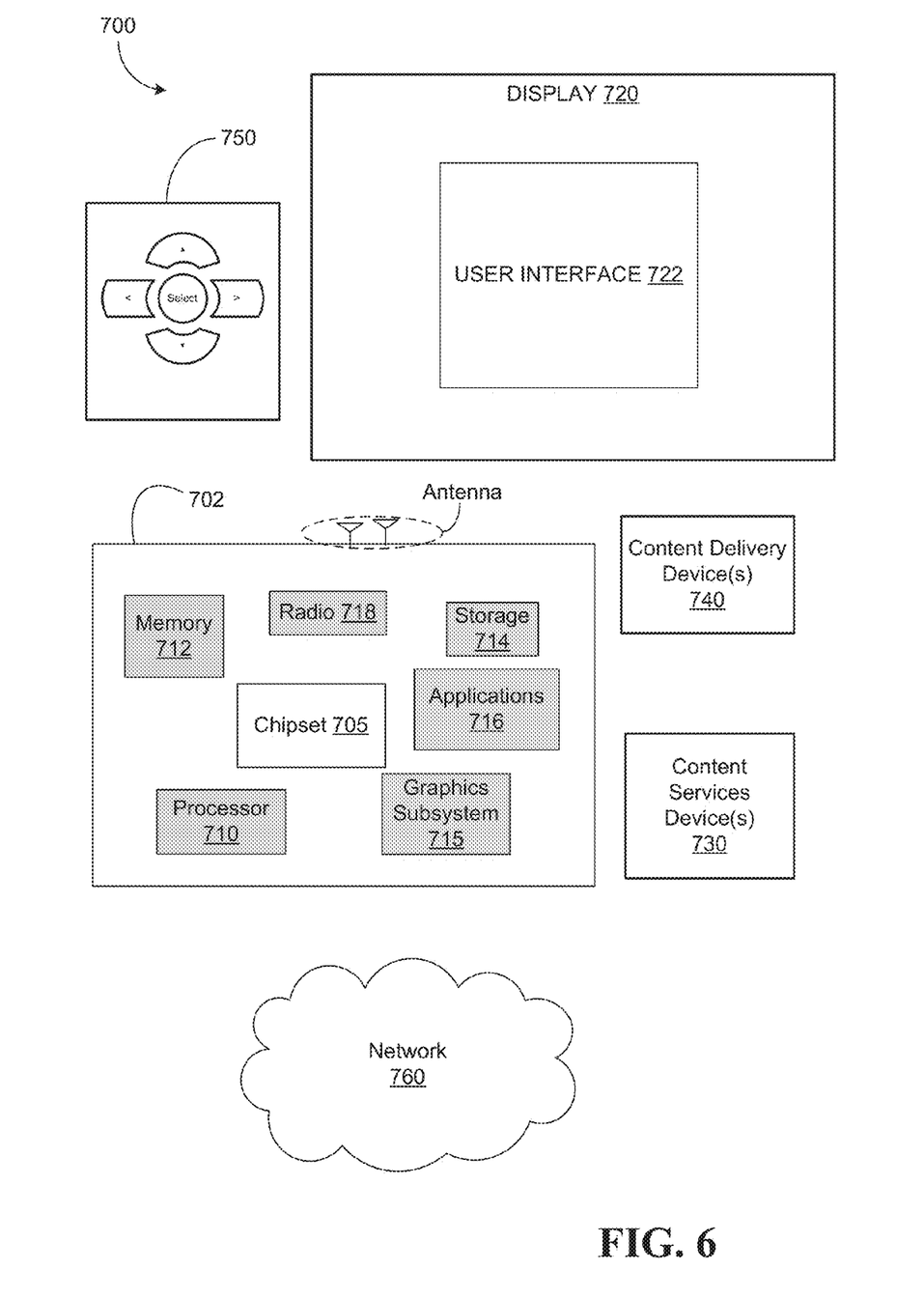
FIG. 6 is a block diagram of an example of a system having a navigation controller according to an embodiment.

FIG. 6 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
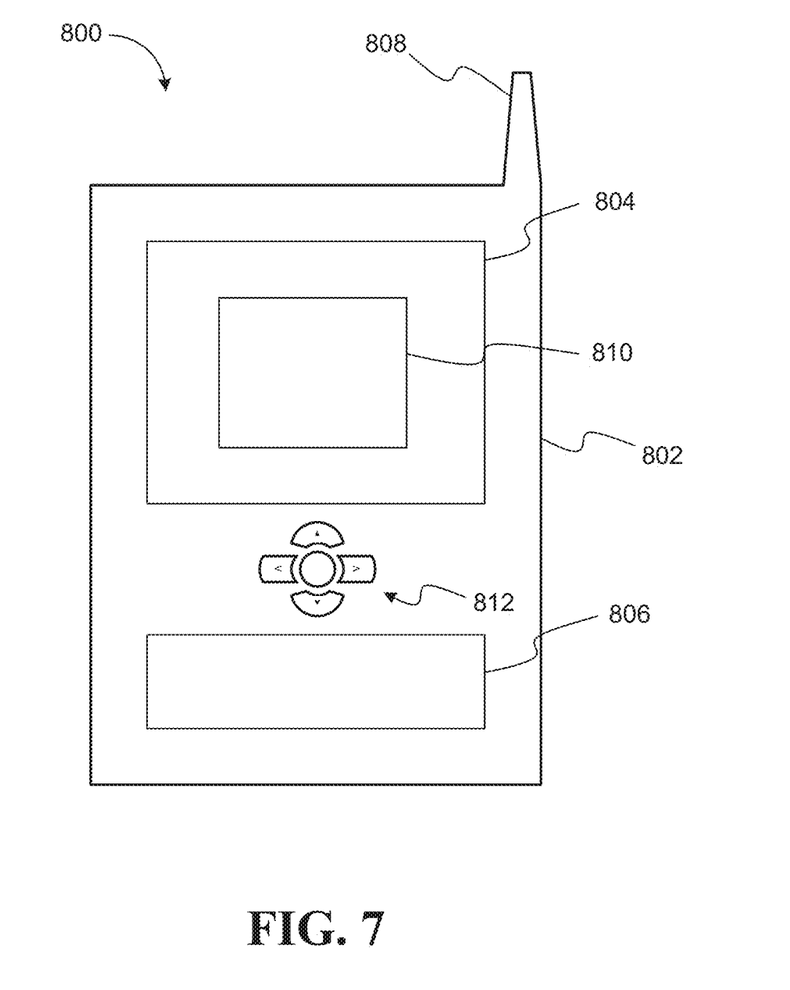
FIG. 7 is a block diagram of an example of a system having a small form factor according to an embodiment.

As described above, system 700 may be embodied in varying physical styles or form factors. FIG. 7 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Techniques described herein may therefore provide a feed-forward system that ensures both real-time operation of the consumer video pipeline and dynamic updating of the operating pipeline to deliver optimal visual perceptual quality and viewing experience. In particular, a discrete control system for the video pipeline can dynamically adapt operating points in order to optimize a global configuration of interactive component modules that are related to video perceptual quality. In a series configuration, the perceptual quality analysis module may be placed before the video processing pipeline and parameters determined for the post-processing pipeline may be used for the same frame. In the case of distributed computation of the quality analysis block or when perceptual quality analysis needs to be performed at intermediate points in the pipeline, the parameters determined using a given frame may be applied on the next frame to ensure real-time operation. Distributed computation is sometimes beneficial in reducing complexity as certain elements for perceptual quality computation may already be computed in the post-processing pipeline and can be re-used. Illustrated approaches may also be compatible with closed-loop control where the perceptual quality analysis is re-used at the output of the video processing pipeline to estimate output quality, which is also used by the control mechanism.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer implemented method comprising:
receiving an input video;
computing perceptual noise in the input video including a smoothed noise estimate from a plurality of noise estimates by sorting the plurality of noise estimates in an M-point window, wherein M is based on one or more of a frame rate of the input video or a predetermined duration of smoothing, and by smoothing the plurality of noise estimates using a Gaussian kernel to obtain the smoothed noise estimate; and
controlling de-noising strength in a post-processing pipeline by modifying a standard deviation for a filter based on the smoothed noise estimate.

2. The method of claim 1, further including using the smoothed noise estimate and a threshold value corresponding to a predetermined noise estimate maximum value to obtain the standard deviation.

3. The method of claim 1, further including increasing the standard deviation to increase the de-noising strength.

4. A computer implemented method comprising:
receiving an input video;
measuring a contrast level of the input video;
measuring a sharpness level of the input video; and
controlling contrast enhancement in a post-processing pipeline, wherein contrast is to be enhanced proportionally to image smoothness determined from the contrast level and inversely proportionally to image sharpness determined from the sharpness level.

5. The method of claim 4, further including:
determining whether the contrast level and sharpness level are of the same local neighborhood of a pixel; and
post-processing one of the contrast level and the sharpness level to ensure that the contrast level and sharpness level are of the same local neighborhood of the pixel.

6. The method of claim 4, further including turning the contrast enhancement off at an edge pixel and in a neighborhood surrounding the edge pixel.

7. The method of claim 4, further including turning the contrast enhancement off when the contrast level is less than a predetermined contrast threshold value and ramping the contrast enhancement up as the contrast level increases above the predetermined contrast threshold value.

8. The method of claim 4, further including turning the contrast enhancement on when the sharpness level is less than a predetermined sharpness threshold value and ramping the contrast enhancement down as the sharpness level increases above the predetermined sharpness threshold value.

9. A computer readable storage medium comprising a set of instructions which, if executed by a processor, cause a computer to:
conduct a perceptual quality analysis of a video, the perceptual quality analysis to include one or more of a noise measurement, a contrast measurement or a sharpness measurement;
set one or more strength parameters of a post-processing module based on the perceptual quality analysis, the strength parameters to include one or more of a de-noising parameter or a contrast parameter, the de-noising parameter to include a smoothed noise estimate from the noise measurement, and the contrast parameter to include the contrast measurement and the sharpness measurement; and
apply the video to the post-processing module to control de-noising strength by modifying a standard deviation for a filter based on the smoothed noise estimate when the strength parameters include the de-noising parameter, and enhance contrast proportionally to image smoothness determined from the contrast measurement and inversely proportionally to image sharpness determined from the sharpness measurement when the strength parameters include the contrast parameter.

10. The medium of claim 9, wherein the perceptual quality analysis is to include a joint analysis of at least two of the noise measurement, the contrast measurement and the sharpness measurement.

11. The medium of claim 9, wherein the noise measurement, the contrast measurement and the sharpness measurement are to be conducted in parallel.

12. The medium of claim 9, wherein the noise measurement, the contrast measurement and the sharpness measurement are to be conducted in series.

13. The medium of claim 9, wherein the perceptual quality analysis is to include a real-time perceptual quality analysis.

14. The medium of claim 10, wherein the joint analysis includes the contrast measurement and the sharpness measurement, and wherein contrast enhancement is to be turned off in one or more of a noisy region and a sharp region of the video.

15. A system comprising:
an image capture module to generate a video;
a post-processing module; and
logic to,
conduct a perceptual quality analysis of the video, the perceptual quality analysis to include one or more of a noise measurement, a contrast measurement or a sharpness measurement,
set one or more strength parameters of the post-processing module based on the perceptual quality analysis, the strength parameters to include one or more of a de-noising parameter or a contrast parameter, the de-noising parameter to include a smoothed noise estimate from the noise measurement, and the contrast parameter to include the contrast measurement and the sharpness measurement, and
apply the video to the post-processing module to control de-noising strength by modifying a standard deviation for a filter based on the smoothed noise estimate when the strength parameters include the de-noising parameter, and enhance contrast proportionally to image smoothness determined from the contrast measurement and inversely proportionally to image sharpness determined from the sharpness measurement when the strength parameters include the contrast parameter.

16. The system of claim 15, wherein the perceptual quality analysis is to include a joint analysis of at least two of the noise measurement, the contrast measurement and the sharpness measurement.

17. The system of claim 15, wherein the noise measurement, the contrast measurement and the sharpness measurement are to be conducted in parallel.

18. The system of claim 15, wherein the noise measurement, the contrast measurement and the sharpness measurement are to be conducted in series.

19. The system of claim 15, wherein the perceptual quality analysis is to include a real-time perceptual quality analysis.

20. An apparatus comprising:
logic to,
conduct a perceptual quality analysis of a video, the perceptual quality analysis to include one or more of a noise measurement, a contrast measurement or a sharpness measurement,
set one or more strength parameters of a post-processing module based on the perceptual quality analysis, the strength parameters to include one or more of a de-noising parameter or a contrast parameter, the de-noising parameter to include a smoothed noise estimate from the noise measurement, and the contrast parameter to include the contrast measurement and the sharpness measurement, and
apply the video to the post-processing module to control de-noising strength by modifying a standard deviation for a filter based on the smoothed noise estimate when the strength parameters include the de-noising parameter, and enhance contrast proportionally to image smoothness determined from the contrast measurement and inversely proportionally to image sharpness determined from the sharpness measurement when the strength parameters include the contrast parameter.

21. The apparatus of claim 20, wherein the perceptual quality analysis is to include a joint analysis of at least two of the noise measurement, the contrast measurement and the sharpness measurement.

22. The apparatus of claim 20, wherein the noise measurement, the contrast measurement and the sharpness measurement are to be conducted in parallel.

23. The apparatus of claim 20, wherein the noise measurement, the contrast measurement and the sharpness measurement are to be conducted in series.

24. The apparatus of claim 20, wherein the perceptual quality analysis is to include a real-time perceptual quality analysis.

* * * * *